United States Patent [19]

Nakazima

[11] 4,418,782
[45] Dec. 6, 1983

[54] GUARD DEVICE OF SNOWMOBILE AGAINST SPLASHES OF SNOW

[75] Inventor: Masatoshi Nakazima, Iwata, Japan

[73] Assignee: Yamah Motor Co., Ltd., Iwata, Japan

[21] Appl. No.: 255,737

[22] Filed: Apr. 20, 1981

[30] Foreign Application Priority Data

Apr. 18, 1980 [JP] Japan ................................ 55-52000

[51] Int. Cl.³ ............................................. B62D 25/16
[52] U.S. Cl. .................................... 180/190; 180/182; 280/152 R; D12/7
[58] Field of Search ........................ 180/197, 180–196; 296/29, 30; 280/160, 21 R, 21 A, 22, 23, 152–156; D12/7

[56] References Cited

U.S. PATENT DOCUMENTS

| | | | |
|---|---|---|---|
| D. 264,830 | 6/1982 | Ishiyama | D12/7 |
| 1,804,304 | 5/1931 | Beane | 280/152 R X |
| 1,916,375 | 7/1933 | Knickerbocker | 180/192 |
| 2,080,161 | 5/1937 | Berggren | 280/152 R X |
| 2,276,310 | 3/1942 | James | 180/182 |
| 3,688,856 | 9/1972 | Boehm et al. | 180/182 X |
| 4,008,777 | 2/1977 | Juto et al. | 180/182 |
| 4,314,618 | 2/1982 | Tamura | 180/193 |
| 4,350,221 | 9/1982 | Ishima | 180/190 |

OTHER PUBLICATIONS

"Come on Over"–©1972 Arctic Enterprises, Inc., Thief River Falls, Minn–Showing: Arctic Cat '73.

*Primary Examiner*—Joseph F. Peters, Jr.
*Assistant Examiner*—Mitchell J. Hill
*Attorney, Agent, or Firm*—Ernest A. Beutler

[57] ABSTRACT

A snowmobile embodying a flexible flap that depends from the rear of the snowmobile body to prevent snow thrown from the driving tread from impinging upon the rear of the snowmobile and its riders. In addition, a permanent, rigid guide extends around the rear of the snowmobile body and rearwardly a sufficient distance to protect the snowmobile and riders from snow in the event the flap deflects during snowmobile operation.

4 Claims, 8 Drawing Figures

GUARD DEVICE OF SNOWMOBILE AGAINST SPLASHES OF SNOW

BACKGROUND OF THE INVENTION

This invention relates to a guard device for a snowmobile and more particularly a guard device that protects the rear portion of the snowmobile from the impingement of snow from thd driving tread of the snowmobile regardless of the running condition.

As is well known, snowmobiles are driven by an endless tread that is positioned beneath and at the rear edge of the vehicle. As a result, the drive tread tends to throw snow upwardly and toward the rear surface of the snowmobile. In order to protect both the vehicle and its occupants from this snow, it has been proposed to provide a flap or shield which depends from the rear of the snowmobile so as to be positioned in the path of the snow thrown from the tread. Because of the operation of the snowmobile over a wide variety of terrains, it has been the practice to permit the flap to move so that it will not strike the ground, particularly when travelling over rough surfaces. As a result, the flap has a tendency to deflect upwardly during running of the vehicle and accordingly the advantages are lost.

It is, therefore, an object of this invention to provide a protective arrangement for the rear of a snowmobile which will be effective regardless of operating conditions.

It is still a further object of this invention to provide a protective device for the rear of a snowmobile which is permanently attached to the body.

SUMMARY OF THE INVENTION

This invention is adapted to be embodied in a protective arrangement for the rear of a snowmobile or the like that has a body and a driving tread. The protective device conprises a splash guard that is affixed to the body of the snowmobile contiguous to the rear portion of the drive tread and extends rearwardly from the body a sufficient distance to prevent snow thrown from the driving tread from impinging on the rear of the body.

DETAILED DESCRIPTION OF THE PREFERRED EMBODIMENT

Figure 1:
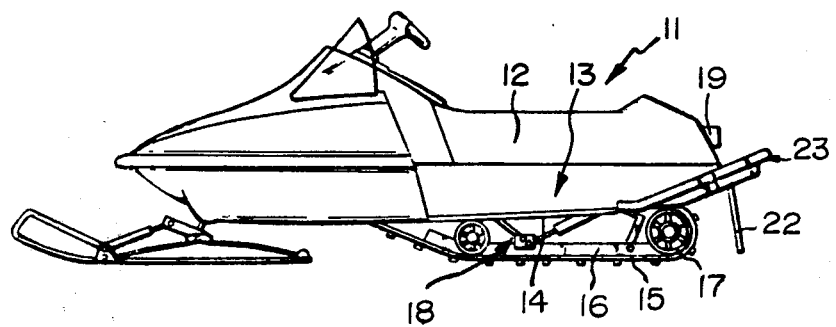
FIG. 1 is a side elevational view of a snowmobile constructed in accordance with the invention.
Figure 2:
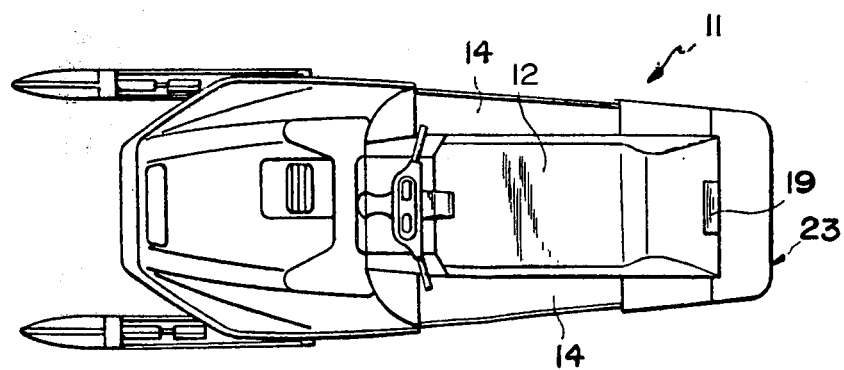
FIG. 2 is a top plan view of the snowmobile.
Figure 3:
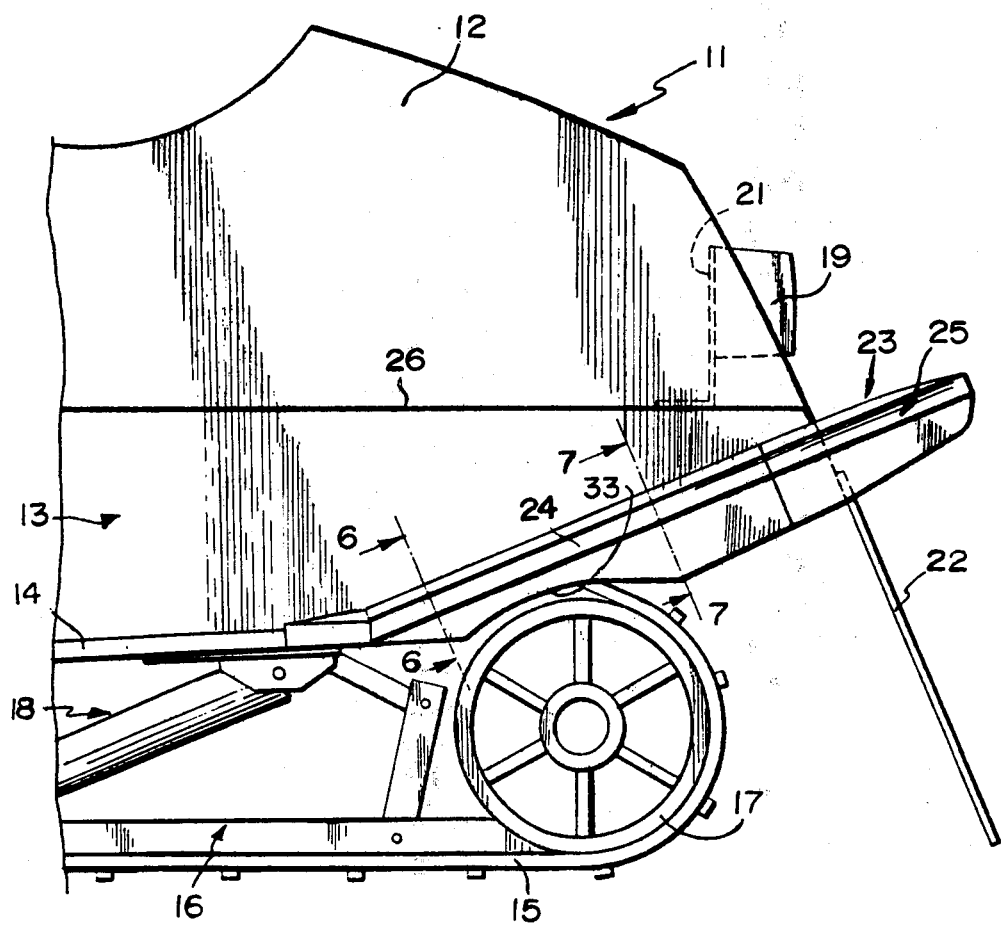
FIG. 3 is a side elevational view taken on a larger scale than FIG. 1 and shows the rear portion of the snowmobile and the protective device constructed in accordance with the invention.

Referring now in detail to the drawings, a snowmobile embodying this invention is identified generally by the reference numeral 11. The snowmobile 11 includes a seat 12 that is supported in a known manner upon the frame or body 13. On opposite sides of the body 13 adjacent the seat 12 the body is also formed with longitudinally extending running boards 14.

The snowmobile 11 is driven in a known manner by means of an endless belt 15 which is positioned toward the rear of the body 13 and which runs over a guard bar 16 and rear idler sprocket 17. A suspension arrangement, indicated generally by the reference numeral 18, is incorporated for suspending the body 13 relative to the driving belt 15.

As is well known, the operation of the snowmobile 11, and specifically the operation of the drive belt 15, causes snow to be thrown upwardly and forwardly to impinge upon the rear of the body 13, the seat 12, the driver and passengers, and also upon a tail light 19 mounted on the bracket 21 at the rear of the frame 13. In order to protect the driver/passenger and these portions of the snowmobile from the snow, it has been the practice to mount a depending flap 22 at the rear of the snowmobile 11. The purpose of the flap 22 is to redeflect the thrown snow downwardly and away from the aforenoted components. Due to the travel of the suspension 18, however, it has been the practice to employ a flexible flap 22 so that it will not impinge upon the surface over which the snowmobile 11 is travelling and ultimately will be deflected upon such contact without damage. By emloying a flexible flap, however, the flap 22 has a tendency to curl or curve upwardly when the snowmobile 11 is travelling and, thus, not completely fulfill its function.

In order to protect the vehicle and its passengers from snow thrown from the tread 15, a guard, indicated generally by the reference numeral 23, is rigidly affixed to the rear portion of the body 13. The guard 23 is a three-piece arrangement consisting of a pair of side pieces 24 and a rear piece 25. The construction of pieces 24 and 25 and their connection to the body 13 is shown in most detail in FIGS. 3 through 8.

Figure 4:
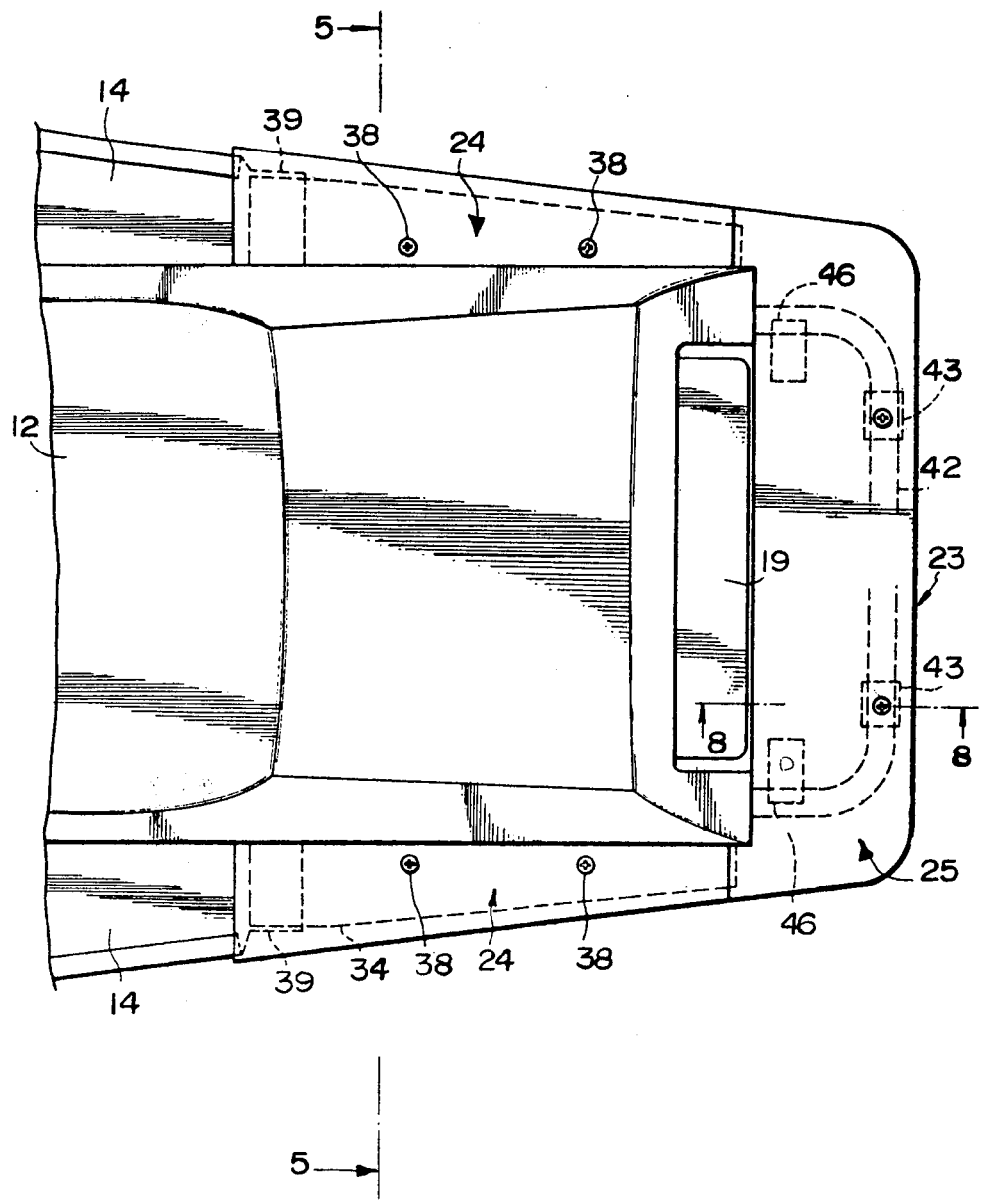
FIG. 4 is a top plan view of the portion shown in FIG. 3.
Figure 5:
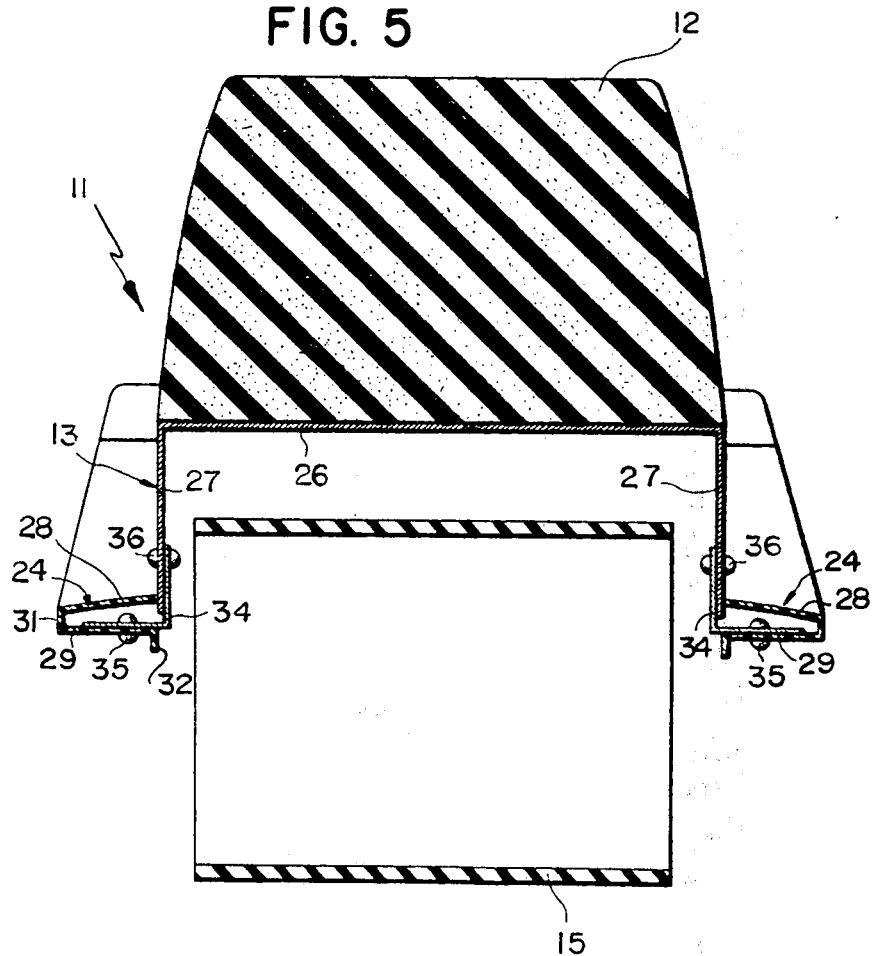
FIG. 5 is a cross-sectional view taken along the line 5—5 of FIG. 4.
Figure 6:
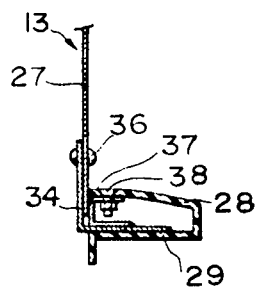
FIG. 6 is a cross-sectional view taken along the line 6—6 of FIG. 3.
Figure 7:
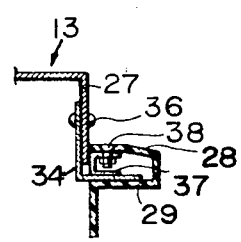
FIG. 7 is a cross-sectional view taken along the line 7—7 of FIG. 3.

The body or frame 13 has, at the rear portion of the snowmobile 11, a generally inverted "U" shape consisting of a center section 26, upon which the seat 12 is placed, and a pair of depending side sections 27 which straddle the tread 15. The guard side pieces 24 are affixed in a manner now to be described to the side sections 27 and extend outwardly therefrom and upwardly toward the rear of the snowmobile 11, as clearly shown in FIGS. 1 and 3. Each guide portion 24 is comprised of a molded plastic section that has a generally "C" shape that tapers inwardly toward the rear of the snowmobile 11 as shown in FIGS. 4, 6 and 7. This shape is comprised of a top flange 28, the inner edge of which abutts the frame portion 27, a bottom flange 29, and an interconnecting, vertically extending leg 31. A depending flange 32 extends downwardly from the inner termination of the flange 29 and is formed with a clearance recess 33 (FIG. 3) to afford access to the idler sprocket 17.

An "L" shaped bracket 34 affords the means for connecting each of the side portions 24 to the depending frame portion 27. One leg of the bracket 39 is affixed to the flange 29 by means of rivets 35 and the other leg of the bracket 34 is affixed to the frame portion 27 by rivets 36. As has been noted, the inner ends of the flanges 28 abutt the outer surface of the frame portions 27. These flanges are also connected to the frame portion 27 by means of a plurality of "C" shaped brackets 37 which are affixed, as by welding or the like, to the frame portions 27 at spaced locations. Screws 38 are employed to connect the flanges 28 to the "C" shaped brackets 37. The running boards 14 also have rearwardly extending portions 39 that nest between the flanges 28 and 29 and provide forwardmost support therefor as well as affording a smooth and continuous appearance to the snowmobile 11.

The rear portion 25 of the guard 23 is connected in such a way as to merge smoothly into the side portions 24 and provide a neat overall appearance. The rear portion 23 is formed of a molded plastic and is comprised of an upper section 40 and a depending skirt portion 41 that extends around all sides except for that which is juxtaposed to the rear of the snowmobile frame, and specifically the frame portion 26. An attaching member in the form of a "C" shaped pipe 42 is affixed to the molded portion by means including a pair of inverted "U" shaped brackets 43 which are welded at an intermediate part of the attaching member 42. The brackets 43 carry weld nuts and screws 45 pass through the molded portion 39 to affix it to the brackets 43. In addition, a pair of "C" shaped brackets 46 are affixed to the ends of the attaching member 42, as by welding. Rivets 48 connect a depending flange 49 of the molded portion to the brackets 46.

The assemblage of the rear guard portion 42 is connected to a pair of spaced stays 51 that have legs 52 which are affixed to the frame portion 26 by means of rivets 53. Each stay 51 is provided with an aperture that passes a male threaded member 54 that is appropriately connected to the ends of the attaching member 42 in any manner, as by welding. Nuts 55 engage the threaded members 54 and affix the assemblage to the frame 13.

The manner of arrangement of the guard consisting of side portions 24 and end portions 25 to the frame 13 should be readily apparent. First, the side portions 24 are slid along the sides of the frame portions 27 and attached in the manner aforedescribed. The end portion 25 is then attached in the manner as described in the preceding paragraph. This completes the assemblage.

Figure 8:
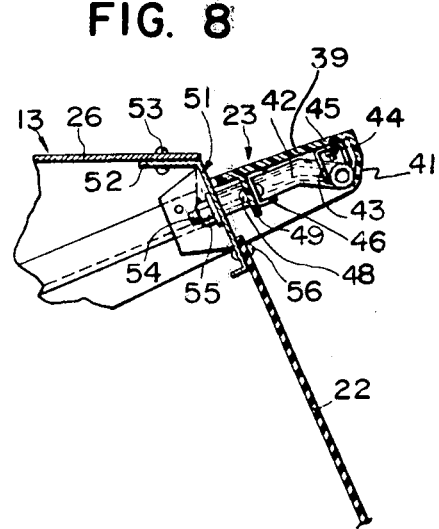
FIG. 8 is a cross-sectional view taken along the line 8—8 of FIG. 4.

As has been previously noted, the flap 22 is formed of a flexible material such as rubber. The flap 22 may be conveniently attached to the stays 51 by means of rivets (FIG. 8).

From the foregoing description it should be readily apparent that the flap 22 will serve the initial purpose of preventing snow from being thrown from the drive tread 15 on the lamp 19, seat 12, and riders of th snowmobile 11. If the flap 22 bends upwardly due to the motion of the snowmobile 11, as may occur at high speeds or due to the motion of the frame 13 on the suspension system 18, the guard 23 will protect both the vehicle portions and the riders from the snow thrown from the tread 15. It is to be understood that the foregoing description is that of a preferred embodiment of the invention and that various changes and modifications may be made without departing from the spirit and scope of the invention as defined by the appended claims.

I claim:

1. A protective device for the rear of a snowmobile or the like having a body and a driving tread, said body being configured so that the rear portion of said driving tread is substantially exposed, said protective device comprising a rigid splash guard fixed to the body of the snowmobile contiguously to the exposed rear portion of the driving tread and extending rearwardly and upwardly therefrom a sufficient distance to prevent snow thrown from the driving tread from impinging on the rear of said body and a flexible flap affixed relative to said splash guard forwardly of the rearwardmost termination thereof and depending therefrom.

2. A protective device for the rear of a snowmobile or the like having a body and a driving tread, said body including sides terminating in an open rear portion so that the rear portion of said driving tread is substantially exposed and running boards extending along said sides and terminating forwardly of said open rear portion, and a protective device comprising a pair of side sections extending rearwardly and upwardly along the rear portion of the sides of the body from said running boards and forming a continuation thereof and an end section spanning the rear portion of said body and extending from the rearward ends of said side sections, said end portion extending rearwardly from said open rear portion of said body a sufficient distance to prevent snow thrown from the driving tread from impinging on the rear of said body.

3. A protective device as set forth in claim 2 wherein the side sections of the protective device are formed from a molded plastic having a generally "C" shape configuration, means for connecting said side sections to said body with at least one of their legs abutting said body said end section of said protective device also being formed of a molded plastic and a generally "U" shape structural member underlying said molded plastic part of said end section and means for affixing said "U" shape structural member to the rear of said body with the molded portion of said end section being abuttedly engaged with the ends of said side sections.

4. A protective device as set forth in claim 3 further including a flexible flap carried by the rear portion of the snowmobile body and being affixed thereto at a point forward of the rearwardmost termination of the end section of said splash guard.

* * * * *